United States Patent
Varga

(10) Patent No.: US 7,835,021 B2
(45) Date of Patent: Nov. 16, 2010

(54) SYSTEMS, METHODS, MEDIA FOR MANAGING THE PRINT SPEED OF A VARIABLE SPEED PRINTER

(75) Inventor: John Thomas Varga, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1577 days.

(21) Appl. No.: 11/134,891

(22) Filed: May 23, 2005

(65) Prior Publication Data

US 2006/0262335 A1    Nov. 23, 2006

(51) Int. Cl.
*G06F 3/12* (2006.01)
*G06K 15/00* (2006.01)

(52) U.S. Cl. .................. 358/1.15; 358/1.16; 358/1.14; 358/1.17; 358/1.18; 358/1.9; 710/56; 710/60; 711/156; 711/149

(58) Field of Classification Search ................ 358/1.15, 358/1.16, 1.14, 1.17, 1.3, 1.18, 296, 1.9, 358/1.12, 444, 1.13
See application file for complete search history.

(56) References Cited

U.S. PATENT DOCUMENTS

| | | | |
|---|---|---|---|
| 4,109,843 A | 8/1978 | Usui et al. | |
| 5,444,827 A | 8/1995 | Briggs et al. | |
| 5,781,707 A | 7/1998 | Kunz et al. | |
| RE35,922 E | 10/1998 | Cuzzo et al. | |
| 6,297,887 B1 | 10/2001 | Yamauchi | |
| 6,508,529 B2 * | 1/2003 | Rasmussen et al. | 347/12 |
| 6,636,325 B1 * | 10/2003 | Kurase | 358/1.14 |
| 6,665,088 B1 | 12/2003 | Chiba et al. | |
| 6,762,855 B1 * | 7/2004 | Goldberg et al. | 358/1.5 |
| 7,576,880 B2 * | 8/2009 | Christiansen et al. | 358/1.15 |
| 2002/0097433 A1 * | 7/2002 | Chang et al. | 358/1.15 |

FOREIGN PATENT DOCUMENTS

| | | |
|---|---|---|
| JP | 2001-142537 | 5/2001 |
| JP | 2003341184 A * | 12/2003 |

* cited by examiner

*Primary Examiner*—Mark K Zimmerman
*Assistant Examiner*—Huo Long Chen
(74) *Attorney, Agent, or Firm*—Duft Bornsen & Fishman, LLP

(57) ABSTRACT

Systems, methods, and media for managing the print speed of a variable speed printer are disclosed. Embodiments include a print controller system having a raster image processor for rasterizing a print job to create a plurality of rasterized pages and a printer controller buffer for storing one or more of the rasterized pages. The printer controller buffer may also transmit at a print engine feed rate the one or more rasterized pages to a print engine. Embodiments may also include a speed control module in communication with the printer controller buffer for determining the print engine feed rate. Further embodiments may include the speed control module determining the print engine feed rate based on one or more of page processing times, page arrival rates, estimated print completion rates, and the number of pages in a print engine buffer.

20 Claims, 4 Drawing Sheets

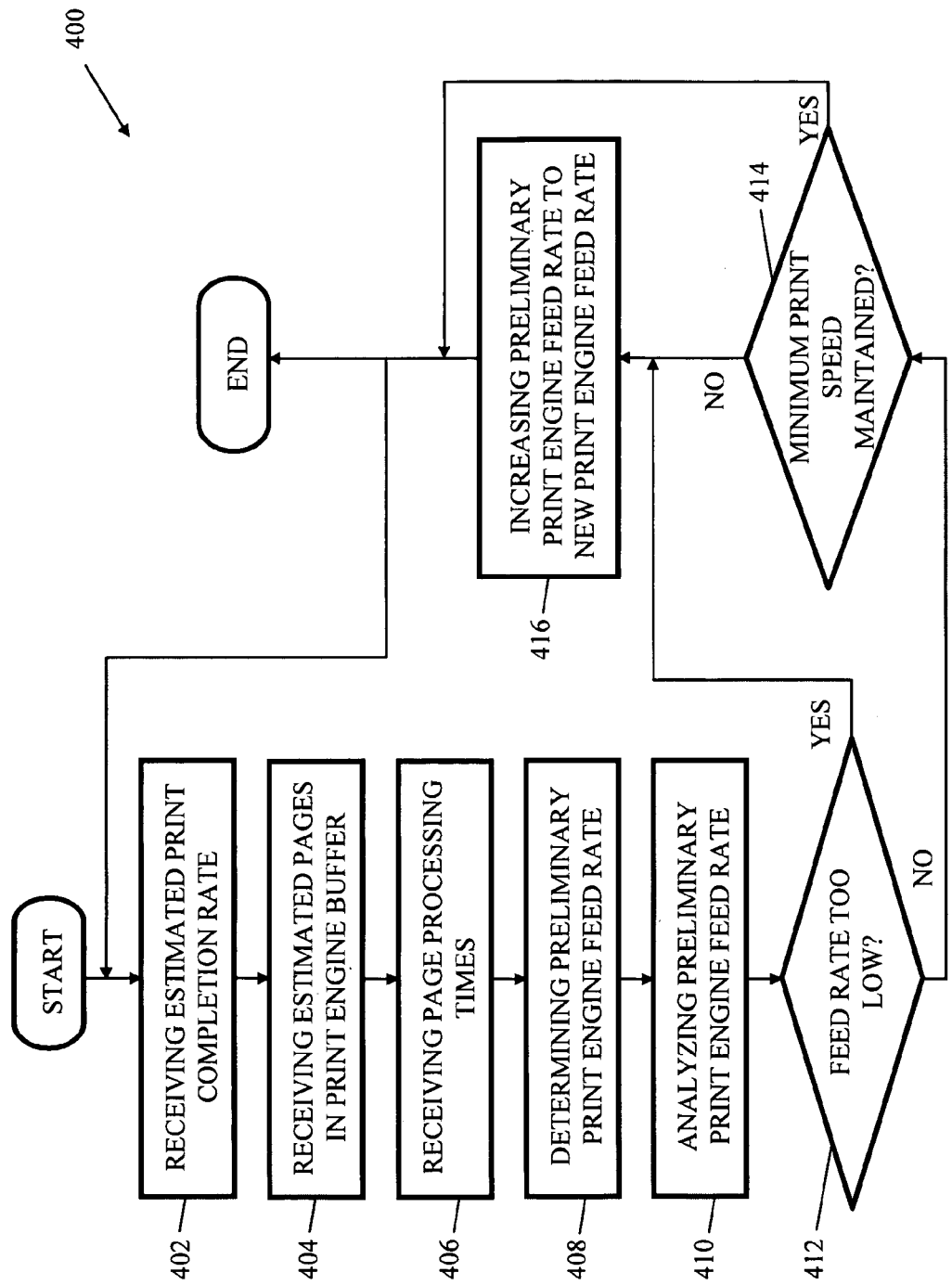

SYSTEMS, METHODS, MEDIA FOR MANAGING THE PRINT SPEED OF A VARIABLE SPEED PRINTER

FIELD OF INVENTION

The present invention generally relates to the field of printing systems. More particularly, the present invention relates to systems, methods, and media for managing the print speed of a variable speed printer.

BACKGROUND

High-volume printers are increasingly used in production of large print jobs, such as book printings or mass mailings. These printers typically are driven by a printer controller and include a print engine that controls a group of printheads that produce printed pages. The print engine also typically includes a print engine buffer to store pages until they can be printed. Some of these high-volume printers, such as some industrial inkjet printers manufactured by Miyakoshi Printing Machinery Co. and others, are variable speed printers that have variable speed print engines that modify the printing speed based on the number of pages in their buffer. Variable-speed printers provide additional flexibility over fixed speed printers, but the variable-speed feature can cause problems when speeds drop too low or when print loads fluctuate.

Print engines for variable speed printers usually have a multi-page buffer of pages to be printed. If the buffer is full, the print engine increases the speed of the printer to the maximum allowable speed. As the buffer empties, the print engine may decrease the speed. If the print engine ever allows the buffer to completely empty and thus runs out of print data to be printed, the printer must print blank pages. Printing blank pages results in paper waste and makes post-processing more difficult and expensive. Post-processing is more difficult as the blank pages need to be removed from the print job either manually or by automated process, both of which result in additional time and expense. This problem is exacerbated for color printheads, such as Cyan Magenta Yellow blacK (CMYK) printheads, where colors are laid down sequentially and a back side may also need to be printed for each page, as well as any printer with multiple printheads.

Some print engines try to solve this problem by beginning to slow down the printer when pages suddenly decrease in availability, such as when the job performance suddenly drops. At times, this drop will occur faster than the print engine can slow down the printer, resulting in an underrun occurring and printing blank pages until the printer is stopped. Large high-volume printers are typically difficult to slow down quickly as they have a large amount of momentum. Even if the momentum problem can be overcome and they physically can be slowed quickly, drastic changes in printer speed can result in additional printing problems. If the speed of a printer changes too quickly, the alignment of the pages between different printheads can be skewed, resulting in blurriness or lengthening or contracting of the printed image. For a CMYK printer, for example, the printer will likely be required to be slowed gradually, as each page must go through the color printheads and possibly a dryer (and possibly for both sides of the paper), making the rate of deceleration even slower. Very strong deceleration may also result in tearing of the roll of paper, requiring the production line to be stopped and the paper reloaded, and resulting in wasted resources of time and materials.

Another solution to this problem is to increase the size of the print engine buffer. This, however, increases the cost of the print engine and serves no other benefit than to better regulate print speed. Such increased print engine buffer is also effectively wasted when smaller or less difficult print jobs are run. Additionally, the print engine buffer is integral to the print engine and thus must be purchased with the print engine itself at a time when printing needs may not yet be fully known.

Another solution to this problem is to provide a manual speed selection on the print engine that allows an operator to manually select the speed at which a print engine will run a particular job. This would require the cooperation of the print engine manufacturer and the printer owner or print controller manufacturer may not have a sufficient business case to ask for special considerations from the print engine manufacturer (i.e., their needs are too small). Moreover, the operator would have to estimate the appropriate speed setting depending on the length and complexity of the job and could underestimate or overestimate the appropriate speed. This would result in either underruns or failures to utilize the best possible speed of the printer.

There is, therefore, a need for an effective and efficient system to manage the print speed of a variable speed printer. There is an even greater need for such a system when the print jobs the printer is used for vary significantly in length or complexity.

SUMMARY OF THE INVENTION

The problems identified above are in large part addressed by systems, methods, and media for managing the print speed of a variable speed printer. One embodiment generally provides a method for rasterizing pages of a print job where the print job has one or more pages to be printed and buffering the rasterized pages in a printer controller buffer. The method may also include estimate a print completion rate and a number of pages in a print engine buffer and determining a print engine feed rate based on the estimated print completion rate and the number of pages in the print engine buffer. The method may also generally include transmitting the buffered rasterized pages to a print engine based on the determined print engine feed rate. Further embodiments of the method may include determining a page arrival rate or page processing times for the print job and determining the print engine feed rate based on the page arrival rate or the page processing times in addition to the estimated print completion rate and the number of pages in the print engine buffer.

Another embodiment provides a machine-accessible medium containing instructions effective, when executing in a data processing system, to cause the system to perform a series of operations for synchronizing a database on a network. The series of operations generally includes rasterizing pages of a print job where the print job has one or more pages to be printed and buffering the rasterized pages in a printer controller buffer. The series of operations may also include estimate a print completion rate and a number of pages in a print engine buffer and determining a print engine feed rate based on the estimated print completion rate and the number of pages in the print engine buffer. The series of operations may also generally include transmitting the buffered rasterized pages to a print engine based on the determined print engine feed rate. Further embodiments of the series of operations may include determining a page arrival rate or page processing times for the print job and determining the print engine feed rate based on the page arrival rate or the page processing times in addition to the estimated print completion rate and the number of pages in the print engine buffer.

A further embodiment provides a print controller system for managing the print speed of a variable speed printer. The system may include a raster image processor for rasterizing a print job to create a plurality of rasterized images and a printer controller buffer in communication with the raster image processor for storing one or more rasterized pages. The printer controller buffer may also transmit at a print engine feed rate the one or more rasterized pages to a print engine. The system may also generally include a speed control module in communication with the printer controller buffer for determining the print engine feed rate. In a further embodiment, the speed control module may determine the print engine feed rate based on one or more of page processing times, page arrival rates, estimated print completion rates, and the number of pages in a print engine buffer.

BRIEF DESCRIPTION OF THE DRAWINGS

Other objects and advantages of the invention will become apparent upon reading the following detailed description and upon reference to the accompanying drawings in which, like references may indicate similar elements:

FIG. 4 depicts an example of a flow chart for increasing the print engine feed rate according to one embodiment.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods, and media for managing the print speed of a variable speed printer are disclosed. Embodiments include a print controller system having a raster image processor for rasterizing a print job to create a plurality of rasterized pages and a printer controller buffer for storing one or more of the rasterized pages. The printer controller buffer may also transmit at a print engine feed rate the one or more rasterized pages to a print engine. Embodiments may also include a speed control module in communication with the printer controller buffer for determining the print engine feed rate. Further embodiments may include the speed control module determining the print engine feed rate based on one or more of page processing times, page arrival rates, estimated print completion rates, and the number of pages in a print engine buffer.

The systems, methods, and media of the disclosed embodiments provide an improved methodology for managing the print speed of a variable speed printer. By utilizing the printer controller buffer to control the contents of the print engine buffer to help manage the speed of the print engine, the disclosed methodology advantageously provides more control over the print speed and a reduced chance of having costly underruns. The disclosed methodology may utilize more information to assist in determining a rate of transmittal of data to the print engine, including information about the complexity and length of the print job. The additional information and improved flexibility of using the printer controller buffer may allow the system of the disclosed embodiments to more smoothly and efficiently print a print job on a variable speed printer.

Figure 1:
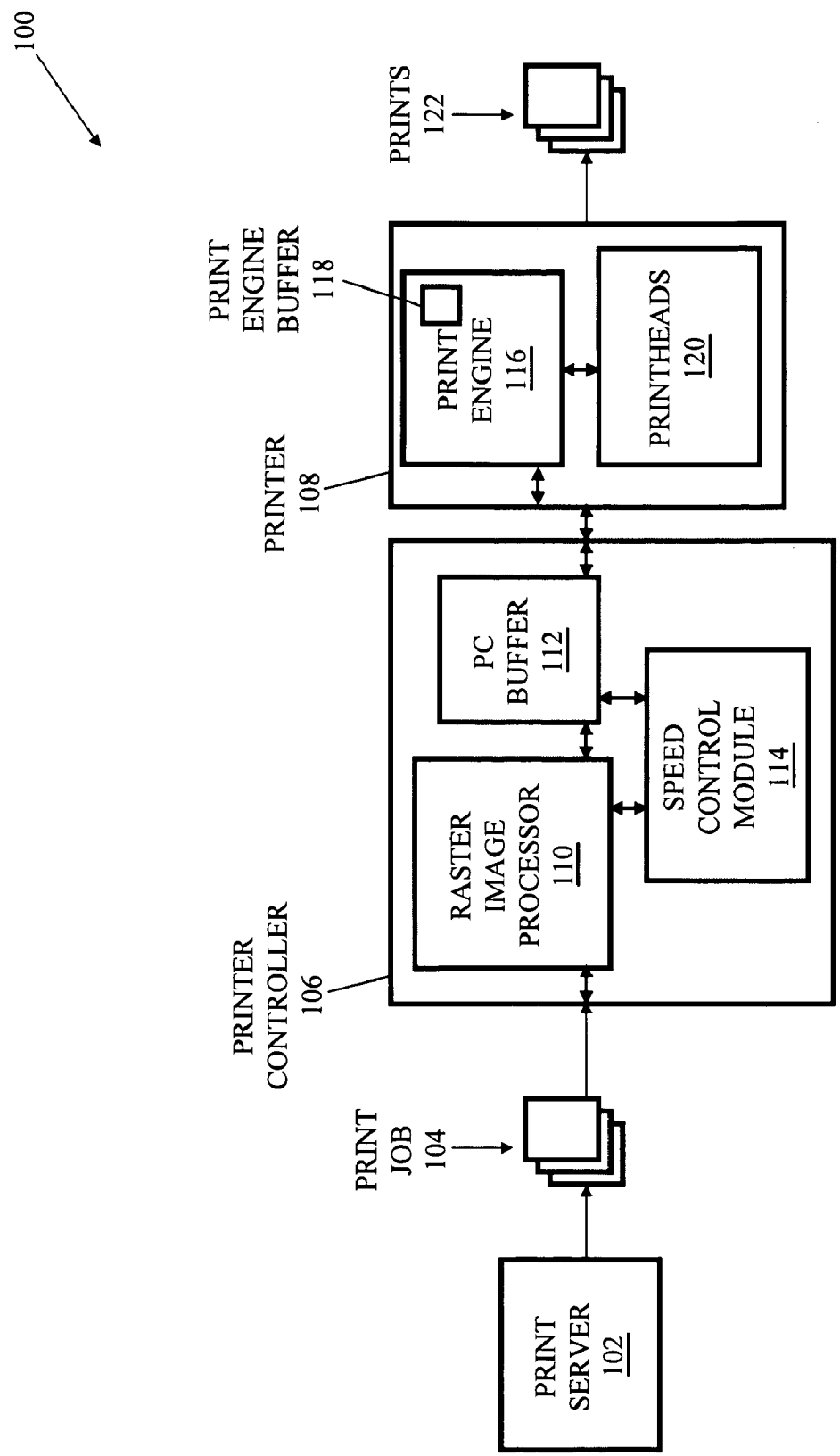
FIG. 1 depicts a schematic view of a variable speed printing system with a printer controller according to one embodiment.

Turning now to the drawings, FIG. 1 depicts a schematic view of a variable speed printing system with a printer controller according to one embodiment. Variable speed printing system 100 may include a printer server 102 that may send one or more print jobs 104 to a print controller 106. The printer controller 106 may process the print jobs 104 and send print data to printer 108 to produce prints 122 as the final result. The components of the variable speed printing system 100 may be located at the same location, such as in the same building or print facility, or could be remote. While the term "remote" is used with reference to the distance between the components of the variable speed printing system 100, the term is used in the sense of indicating separation of some sort, rather than in the sense of indicating a large physical distance between the systems. In one example, the print server 102 may be located at a different facility than other components and communicate with the printer controller 106 via a network. Any of the components of the variable speed printing system 100 may also be combined in any fashion. In one example, the printer server 102 and print controller 106 may be executing on the same computer system.

The components of the variable speed printing system 100 may be in communication with each other by any means. In one embodiment, a network such as the Internet, an intranet, a LAN, a WAN, an Ethernet network, or a wireless network may connect components. In another embodiment, cables or other physical connections may connect different components. Those skilled in the art will recognize that the variable speed printing system 100 may utilize any type of data communication channel between components without departure from the scope and spirit of the invention.

The print server 102 may generate or process print jobs 104 and transmit the generated print jobs 104 to the printer controller 106 for eventual transmission to the printer 108 for printing. The print server 102 may have or receive a data stream representing a print file and then translate the print file into an appropriate data stream, such as International Business Machine Corp.'s (IBM's) Intelligent Printer Data Stream (IPDS) printer protocol. The print server 102 (as well as other components of the variable speed printing system 100) may, in one embodiment, be software and/or state machines implemented on one or more of any type of computer system, including servers, personal computers, workstations, mainframe computers, notebook or laptop computers, desktop computers, or the like. In one example, the print server 102 may be implemented on an IBM® eServer or similar server having one or more processors, or threads of processors, executing software and/or one or more state machines coupled with data storage devices such as random access memory (RAM), read only memory (ROM), flash memory, compact disk drives, hard drives, and the like.

The printer controller 106 may receive the print jobs 104 from the print server 102 via the data stream and then process and transmit the print jobs 104 to the printer 108. The printer controller 106 may execute on a stand-alone computer system or processor or any other computer system. The printer controller 106 may include a raster image processor 110, a printer controller buffer 112, and a speed control module 114. The raster image processor 110 may rasterize the data in the data stream by generating rasterized data, such as text, graphics, objects, or fonts. The raster image processor 110 may also generate a sheet specification (e.g., length, width, margins, and other format parameters) for different pages of the print job 104. The raster image processor 110 may essentially translate the data stream representing the print job 104 into a series of commands describing what the printheads 120 need to do in order to produce prints 122.

The rasterized data or any other information generated by the raster image processor 110 may be stored in the printer controller buffer 112. The printer controller buffer 112 (which may also be known as a sheet queue) may store or queue the rasterized print job 104 until it transmits them to the printer 108 for printing. The printer controller buffer 112 may be any type of volatile or non-volatile memory or data storage device. In one embodiment, the printer controller buffer 112 may operate in a first-in, first-out order (i.e., the first sheet specification sent to buffer 112 is processed first).

The speed control module 114 of the printer controller 106 may advantageously provide control of the speed of the printer 108. The speed control module 114 may utilize the printer controller buffer 112 to regulate the flow of data to the printer 108, thus indirectly controlling its speed. The speed control module 114 may increase or decrease the rate of data flow to the printer 108 and thus indirectly control its speed while also attempting to maintain the minimum print speed of the printer 108, as described in more detail in relation to FIGS. 2-4. The speed control module 114 may receive information about the rate of the data received by the printer controller 106 as well as the processing of data by the raster image processor 110. Potentially coupled with knowledge of the contents of the printer controller buffer 112 and the operation of the printer 108 (including possibly the contents of its buffer and the current print speed), the speed control module 114 may use this information to provide sophisticated control of the flow of data to the printer 108 and the printer 108 speed.

The printer 108 may include a print engine 116 and one or more printheads 120. The print engine 116 may also include a print engine buffer 118. The print engine 116 may generate a page for printing based on the control signals provided by the printer controller 106 and pass pages for printing to the printheads 120, which control the mechanical or physical imprinting of pages of text or graphics onto sheets of paper. In one embodiment, the print engine 116 may automatically buffer any received pages to print engine buffer 118, after which the pages are sent to the printheads 120 for printing. The print engine 116 may attempt to control the speed of printing by the printheads 120 by regulating the flow of data to the printheads 120. The print engine 116 may use the amount of pages in the print engine buffer 118 and the current print speed in making the determination of its desired speed. For example, if the print engine buffer 118 is full, the print engine 116 may increase the rate of printing up to the maximum amount while if the print engine buffer 118 is nearly empty, the print engine 116 may decrease the rate of printing. As described previously, the print engine buffer 118 may be limited in its ability to control the speed in some situations, particularly when there are sudden drops in the rate of pages to be printed, causing an underrun to occur.

The speed control module 114 of the disclosed embodiments advantageously provides an additional level of control over the print speed of the printer 108. The speed control module 114 may indirectly control the print engine 116 speed by regulating the amount of information contained in the print engine buffer 118, which is used by the print engine 116 to determine its speed. The speed control module 114 may provide a number of benefits over previous systems. First, the speed control module 114 may allow the printer controller buffer 112 to be utilized in addition to the print engine buffer 118, allowing the total effective buffer size to be increased without having to increase the size of the print engine buffer 118. The operator of a printer controller 106 may therefore purchase a cheaper printer 108 with a smaller print engine buffer 118 and still achieve comparable performance when compared to larger-buffered printers 108 by management using the speed control module 114. Adding buffer size to a printer controller buffer 112 may also be less expensive than adding to the print engine buffer 118 as printer 108 manufacturer costs and mark-ups are avoided.

The larger effective buffer size also may provide more effective and efficient control and assist in minimizing or preventing costly underruns. For example, a larger effective buffer size may provide additional flexibility in slowing print speed for a longer time without having an underrun, thus providing the ability to absorb longer or deeper increases in the print page load or complexity. Similarly, a larger effective buffer size may provide an additional capability of running printer 108 at its maximum or optimal speed by feeding its buffer with stored data in the printer controller buffer 112 during times of lower print load.

Additionally, the speed control module 114 has access to additional useful information than the print engine 116 and thus may make more sophisticated and accurate decisions as to the nature of upcoming pages to be printed. The speed control module 114 may utilize current print speed information as well as information regarding the contents of the print engine buffer 118, similarly to the print engine 116. The speed control module 114, however, may also use information regarding the contents of the printer controller buffer 112 as well as information about the nature of the print jobs 104 coming in to the printer controller. Information about the print job 104 entering the printer controller 106 may include the relative complexity of the pages to be printed, the rate of pages being received by the printer controller 106, and the like. The speed control module 114 may therefore have superior information than the print engine 116, including the complexity of pages to be printed, allowing it to better predict the print rate needed to optimize printing.

The use of information about the print job 104 by the speed control module 114 in determining a print engine feed rate illustrates how the methodology of the disclosed embodiments may improve performance of the variable speed printing system 100 when compared to previous systems. By using print job 104 information in addition to print completion rate and pages in the print engine buffer 118, the speed control module 114 may more precisely control the print engine 116 speed by regulating or modulating the print engine feed rate from the printer controller buffer 112 to the print engine buffer 118. Moreover, the speed control module 114 may also prevent many costly underruns by storing pages in the printer controller 106 for later transmittal to the print engine 116 to help the print engine 116 to maintain its speed during downturns in the print job 104. Previous systems that relied solely upon information available in the printer 108 were ill-suited to handle drastic increases or decreases in the size or complexity of the print job 104 or to consistently prevent underruns. Regulating the print engine feed rate allows the speed control module 114 to use the printer controller buffer 112 as additional buffer space and to "artificially" control the print engine 116 by effectively fooling the print engine 116 as to the rate at which the data needs to be printed. The system of the disclosed embodiments may effectively improve the performance of the variable speed printing system 100 without requiring assistance from the printer 108 or print engine 116 providers or the purchase of additional print engine buffer 118.

In an alternative embodiment, the speed control module 114 may not have direct access to the state or capacity of the print engine buffer 118, as some printers 108 may not provide this information. In this embodiment, the speed control module 114 may use information relating to the contents of the printer controller buffer 112 instead of that of the print engine buffer 118. For example, if the printer controller buffer 112 is full, the speed control module 114 may increase the rate to the print engine 116. By keeping the printer controller buffer 112 full, the disclosed system will have the more time to change the engine speed in case the rate drops dramatically. As long as the printer controller buffer 112 is full, the speed control module 114 may raise the rate to the print engine 116 until its fills up and will not accept additional pages. In this example, the print engine 116 may speed up in response to the increase in rate to the engine so that it can accept pages at a higher rate. In another example, if the printer controller buffer 112 is not full, the speed control module 114 may reduce the rate to match the incoming rasterized pages into the printer controller buffer 112.

Figure 2:
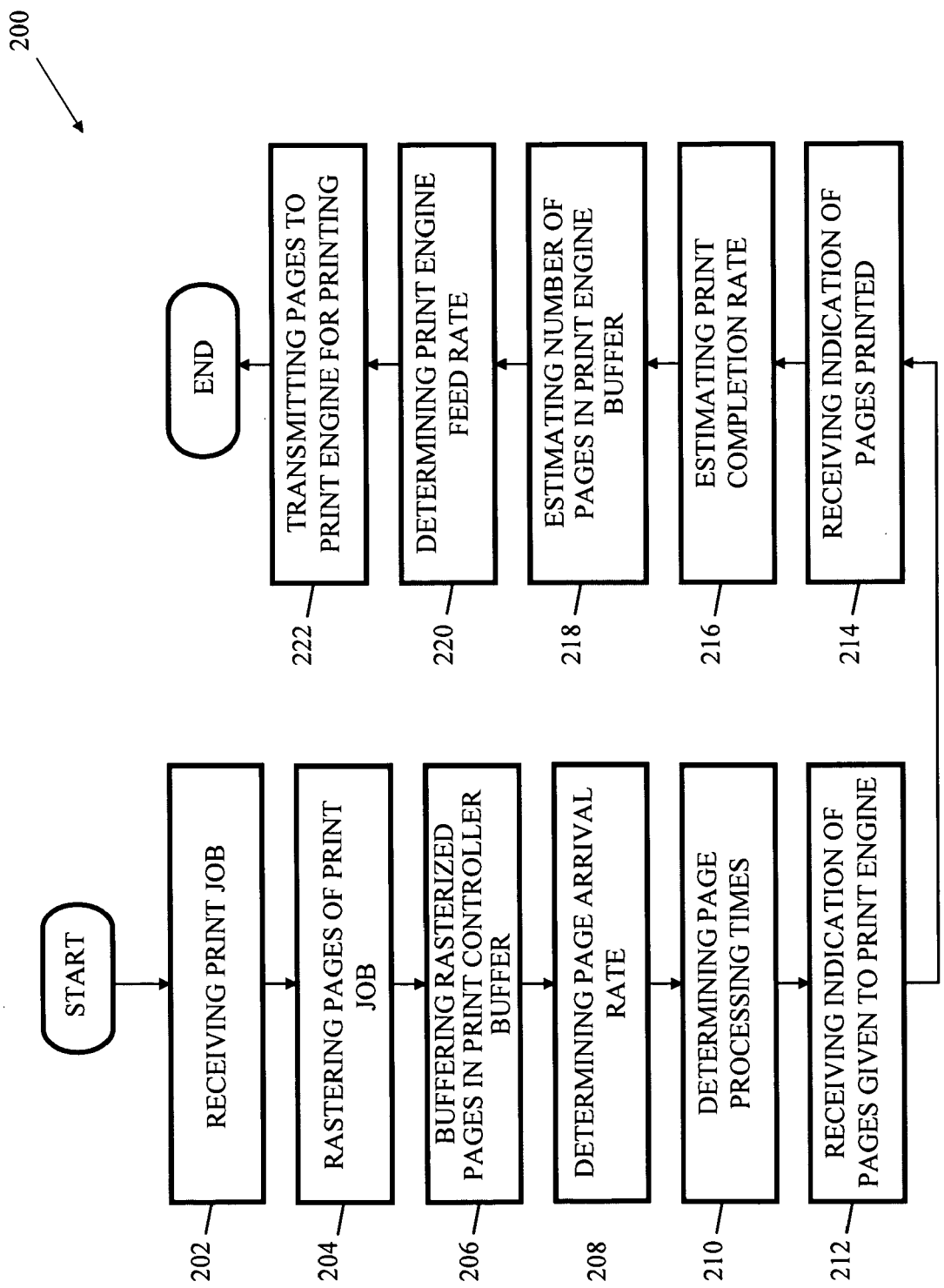
FIG. 2 depicts an example of a flow chart for processing a print job and determining a print engine feed rate according to one embodiment.

FIG. 2 depicts an example of a flow chart for processing a print job and determining a print engine feed rate according to one embodiment. The elements of flow chart 200 may be performed, in one embodiment, by components or combinations of components of the printer controller 106. Flow chart 200 begins with element 202, receiving a print job 104. In one embodiment, the printer controller 106 may receive the print job 104 from the print server 102 via a network or cable. After receiving the print job 104 at element 202, the raster image processor 110 may rasterize the pages of the received print job 104 at element 204 at a page rasterization completion rate. The raster image processor 110 may then buffer the rasterized pages in the printer controller buffer 112 at element 206.

As the print job is rasterized and buffered, the speed control module 114 may determine the page arrival rate at element 208 and the page processing times at element 210. The speed control module 114 may determine the page arrival rate based on the arrival of pages of print job 104 at the printer controller 106. An increase in the page arrival rate may represent in an increase in print job 104 pages required to be printed, while a decrease in the page arrival rate may represent a slow-down in the print job 104. This may be a result of the processing time for the print server 102 or the amount of data on each page. The speed control module 114 may determine the page processing times based on the processing time required by the raster image processor 110 to process pages of a print job. Longer page processing times may indicate a more complex page for printing (e.g., a graphics-intensive page such as a photograph or other detailed image) while shorter processing times may indicate less complex pages (e.g., text-only pages).

The speed control module 114 may also optionally receive information about the printer 108 status in addition to print job 104 details. At element 212, the speed control module 114 may receive an indication of the pages given to the print engine 110 for printing. In one embodiment, the speed control module 114 may receive an indication of a 'commit' counter that provides an indication of the pages given to the print engine 110 and for which the print engine 110 is committed to print. At element 214, the speed control module 114 may receive an indication of the pages printed by the printer 108. In one embodiment, the speed control module 114 may receive an indication of a 'stacked' counter from the printer 108. The 'stacked' counter may provide an indication of how many pages have been printed and traveled a particular distance into a post-processing device. The distance into the post-processing device may represent, in one example, a distance sufficient that there is a reasonable certainty that the page has been printed and handled (e.g., cut or otherwise processed) successfully, so that the printer 108 need not reprint the page.

Alternatively, the speed control module 114 may determine or estimate information about the printer 108 status in the event that such information is not received by the speed control module 114. When the speed control module 114 feeds pages at the fastest rate to the printer 108 (where they cannot be accepted), the speed control module 114 may infer the capacity of the paper path and print engine buffer 118 as the print engine buffer 118 is likely full. To slow the printer 108, the speed control module 114 may back off the feed rate and see the number of pages held by the printer 108 decrease, which may provide an indication of the number of pages held by the printer 108. By varying feed rates and making measurements of the available information to see how full the print engine buffer 118 is kept at different print speeds, the speed control module 114 may thus characterize the print engine 116 and "learn" about how it operates. This information may be dynamically determined for unknown engines or statically determined by the print controller manufacturer to optimize the algorithms in the speed control module 114.

The speed control module 114 may, after receiving the inputs previously described, estimate the print completion rate of the printer 108 at element 216. The speed control module 114 may extrapolate the print completion rate from the received indication of the pages printed over time in order to estimate the rate in one embodiment. In another embodiment, the speed control module 114 may receive an indication of the print completion rate directly from the printer 108. The speed control module 114 may also estimate the number of pages in the print engine buffer 118 at element 218. In one embodiment, the speed control module 114 may estimate the number of pages in the print engine buffer 118 based on the difference between the number of pages printed and the number of pages given to the print engine 108.

The method of flow chart 200 then continues to element 220, where the speed control module 114 may determine the print engine feed rate. The print engine feed rate is the rate at which rasterized pages of print job 104 are fed from the printer controller buffer 112 to the print engine 116. As described previously, the speed control module 114 may consider any type of information in determining the print engine feed rate, including the page arrival rate, page processing times, the print completion rate, and the number of pages in the print engine buffer 118. As will be described in more detail in relation to FIGS. 3 and 4, the speed control module 114 may indirectly control the speed of printing by the print engine 116 by controlling the rate of information flowing from the printer controller buffer 112 to the print engine buffer 118. Using the print completion rate and number of pages in the print engine buffer 118, the speed control module 114 may have insight into the current operation of the printer 108 and may thus determine how the print engine 116 will react to more or less pages being sent to it. For example, in some embodiments the print engine feed rate may be increased in response to a reduction in the number of pages in the print engine buffer, while in other embodiments the print engine feed rate may be decreased in response to an increase in the number of pages in the print engine buffer. The page arrival rate and page processing times give the speed control module 114 an insight into the upcoming print load that the print engine 116 does not have, allowing the speed control module 114 to anticipate changes in the print load and compensate the flow of data to the print engine 116 accordingly. The speed control module 114 may thus 'artificially' control the print engine 116 speed by adjusting the print engine feed rate based at least in part on factors not known to print engine 116. After the speed control module 114 determines the print engine feed rate, the printer controller buffer 112 may transmit the pages to the print engine 108 at element 222 for printing at the print engine feed rate, after which the method terminates.

Figure 3:
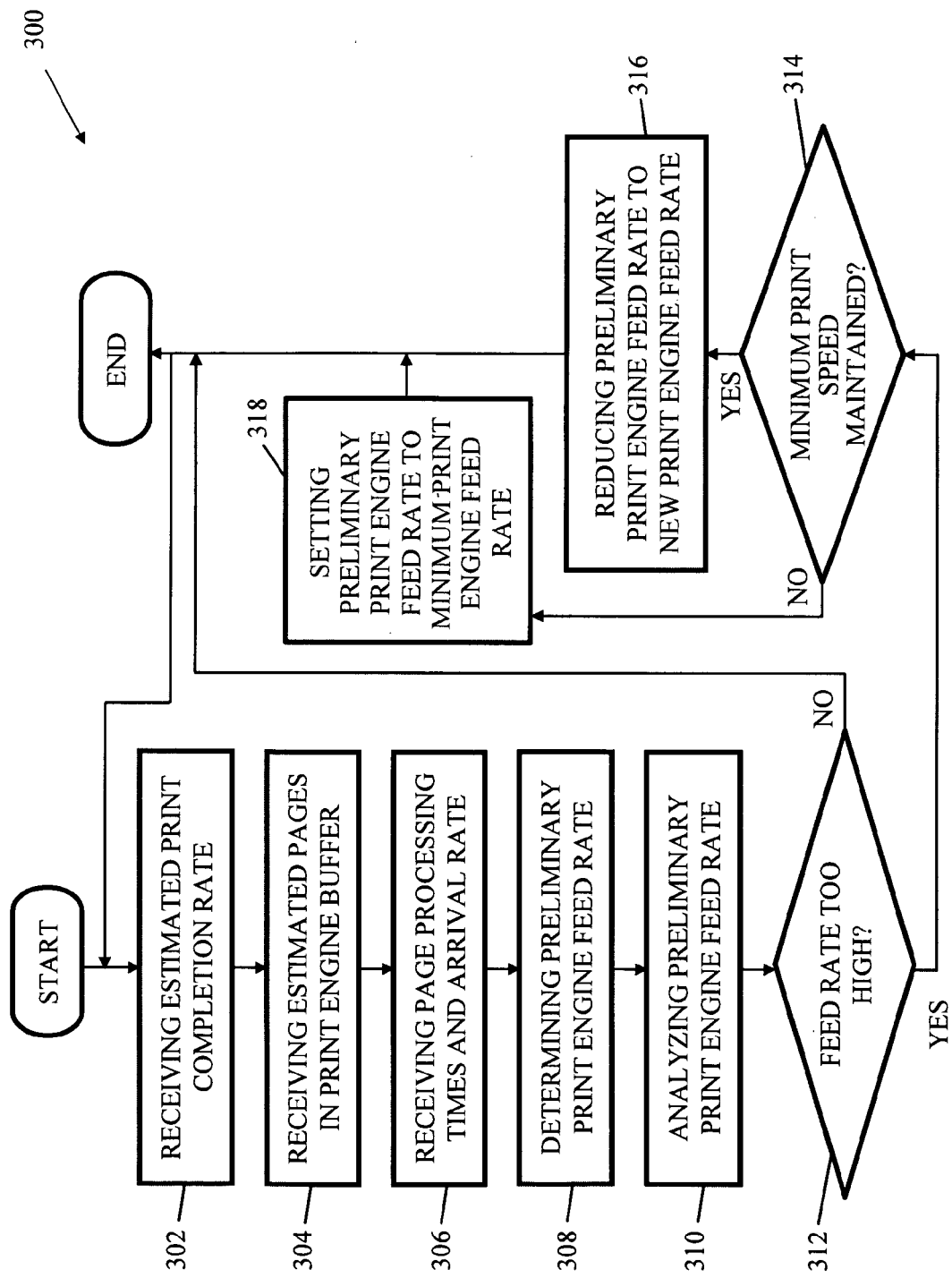
FIG. 3 depicts an example of a flow chart for reducing the print engine feed rate according to one embodiment.

FIG. 3 depicts an example of a flow chart for reducing the print engine feed rate according to one embodiment. The elements of flow chart 300 may be performed, in one embodiment, by the speed control module 114 or other components of the printer controller 106. Some or all of the elements of flow chart 300 may be performed as part of element 220 of flow chart 200. Flow chart 300 begins with element 302, receiving an estimated print completion rate and element 304, receiving an estimate of the pages in the print engine buffer 118. In one embodiment, the speed control module 114 may estimate the print completion rate and the pages in the print engine buffer 118 based on inputs received from printer 108, as described in relation to elements 216 and 218 of FIG. 2. After receiving the estimates, the method of flow chart 300 may continue to element 306, receiving page arrival rate and page processing times. In one embodiment, the page arrival rate and page processing times at the print controller 106 may be determined by speed control module 114 based on inputs from the raster image processor 110.

The method of flow chart 300 continues to element 308, determining a preliminary print engine feed rate. In one embodiment, the speed control module 114 may use the print engine feed rate used previously as the preliminary print engine feed rate. Alternatively, the speed control module 114 may use any type of algorithm to determine the preliminary print engine feed rate. After determining the preliminary print engine feed rate, the speed control module 114 may analyze the preliminary print engine feed rate to determine if the preliminary print engine feed rate is too high at element 310. The speed control module 114 may base its determination of whether the preliminary print engine feed rate is too high based on an analysis of the received information regarding the print job 104 and printer 108 status. For example, if the print engine 116 is producing stacked pages at a rate greater than the arrival rate of rasterized pages into the printer controller buffer 112, the speed control module 114 may determine that the print engine feed rate is too high. In another example, if the speed control module 114 determines that the print job 104 is increasing in complexity based on the page processing times and/or arrival rate decreasing, it may begin decreasing the print engine feed rate in anticipation of the upcoming increased load. This will allow the print engine buffer 118 to begin clearing and for the print engine 110 to begin slowing down, both of which will increase the capacity of the printer 108 to handle a heavier load and reduce the chance of drastic changes in print speed.

If the speed control module 114 determines that the feed rate is not too high at decision block 312, the method of flow chart 300 either terminates or returns to element 302 for continued processing. If the speed control module 114 determines that the print engine feed rate is too high at decision block 312 based on its analysis at element 310, the method continues to decision block 314, where the speed control module 114 may determine if the minimum print speed is being maintained. In one embodiment, the speed control module 114 may ensure that any reduction in the print engine feed rate does not result in the minimum print speed being reached or an underrun condition being achieved. If the minimum print speed is being maintained based on the adjusted print engine feed rate, the method of flow chart 300 may continue to element 316, where the speed control module 114 may reduce the preliminary print engine feed rate to a new print engine feed rate, after which the method either terminates or returns to element 302. If the minimum print speed is not being maintained based on the new print engine feed rate, the method proceeds to element 318, where the preliminary print engine feed rate is set to the minimum print engine feed rate, after which the method either terminates or returns to element 302. This may prevent the speed control module 114 from lowering the print engine feed rate too far and causing a printer 108 underrun.

FIG. 4 depicts an example of a flow chart for increasing the print engine feed rate according to one embodiment. The elements of flow chart 400 may be performed, in one embodiment, by the speed control module 114 or other components of the printer controller 106. Some or all of the elements of flow chart 400 may be performed as part of element 220 of flow chart 200. Elements 402, 404, 406, and 408 may be substantially similar to elements 302, 304, 306, and 308 of FIG. 3, respectively, and the discussion will not be repeated in the interests of brevity.

After determining the preliminary print engine feed rate at element 408, the speed control module 114 may analyze the preliminary print engine feed rate to determine if the preliminary print engine feed rate is too low at element 410. The speed control module 114 may base its determination of whether the preliminary print engine feed rate is too low based on an analysis of the received information regarding the print job 104 and printer 108 status. For example, if the print engine buffer 118 is not full and the stacked page rate is less than the arrival rate of rasterized pages into the printer controller buffer 112, the speed control module 114 may determine that the print engine feed rate is too low. By maintaining a desired level of pages to be printed in the print engine buffer 118 up to the maximum speed of the engine, the maximum performance of the engine may be achieved.

In another example, if the speed control module 114 determines that the print job 104 is decreasing in complexity based on the page processing times and/or arrival rate increasing, it may begin increasing the print engine feed rate in anticipation of the upcoming decreased load. This may help fill up the print engine buffer 118 so that the print engine 110 begins to increase the printer speed. This may increase the capacity of the printer 108 to handle the upcoming lighter load and reducing the possibility of the overall print rate being limited by the printer's 108 limited print engine feed rate.

If the speed control module 114 determines that the feed rate is too low at decision block 412, the method of flow chart 400 continues to element 416, where the speed control module 114 may increase the preliminary print engine feed rate to the new feed rate determined at element 410, after which the method either terminates or returns to element 402 for further processing. If the speed control module 114 does not determine that the feed rate is too low, the method of flow chart 400 continues to element 414, where the speed control module 114 may determine whether the current feed rate allows the minimum print speed to be maintained. If the minimum print speed is being maintained, the print engine feed rate is not increased and the method either terminates or returns to element 402. If the minimum print speed is not being maintained, the method may continue to element 416 to increase the print engine feed rate even though the feed rate was not considered too low at decision block 412. In this embodiment, the need to maintain a minimum print speed may override a determined print engine feed rate in order to avoid costly overruns. The additional capacity of the printer controller buffer 112 and its ability to store pages to print in anticipation of slowdowns in the page arrival rate may allow for an increased capacity for the minimum print speed to be maintained and underruns to be avoided.

While exemplary algorithms for determining the print engine feed rate are described in relation to FIGS. 3 and 4, one skilled in the art will recognize that other algorithms or methodologies may also be used to determine the print engine feed rate. The speed control module 114 may, for example, dispense with a preliminary print engine feed rate and instead directly calculate a print engine feed rate after considering some or all of the various inputs, effectively combining the methods of flow charts 300 and 400. In this example, the print engine feed rate may be compared to an anticipated print speed to ensure that the minimum print speed is maintained.

Each software program described herein may be operated on any type of computer, such as a personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for managing the print speed of a variable speed printer. It is understood that the form of the invention shown and described in the detailed description and the drawings are to be taken merely as examples. It is intended that the following claims be interpreted broadly to embrace all the variations of the example embodiments disclosed.

What is claimed is:

1. A method for managing the speed of a variable speed printer by a printer controller, the method comprising:
   rasterizing pages of a print job, the print job having one or more pages to be printed;
   buffering the rasterized pages in a printer controller buffer;
   estimating a print completion rate and a number of pages in a print engine buffer of a print engine;
   determining, at the printer controller, a print engine feed rate based on the estimated print completion rate and the number of pages in the print engine buffer, wherein the print engine feed rate is the rate at which the rasterized pages are fed from the printer controller buffer to the print engine buffer; and
   transmitting the buffered rasterized pages to the print engine at a rate based on the determined print engine feed rate;
   wherein the printer controller is in communication with the variable speed printer.

2. The method of claim 1, further comprising receiving the print job from a print server.

3. The method of claim 1, further comprising:
   determining a page arrival rate for the print job; and
   determining the print engine feed rate based on the page arrival rate in addition to the estimated print completion rate and the number of pages in the print engine buffer.

4. The method of claim 1, further comprising:
   determining a page rasterization completion rate into a printer controller buffer; and
   determining the print engine feed rate based on the page rasterization completion rate in addition to the estimated print completion rate and the number of pages in the print engine buffer.

5. The method of claim 1, further comprising:
   determining page processing times for the print job; and
   determining the print engine feed rate based on the pages processing times in addition to the estimated print completion rate and the number of pages in the print engine buffer.

6. The method of claim 1, further comprising:
   determining a preliminary print engine feed rate based on a previously used print engine feed rate; and
   receiving an indication of a number of pages given to the print engine.

7. The method of claim 1, wherein determining the print engine feed rate comprises determining that the print engine feed rate is not too low and increasing the print engine feed rate after determining that a minimum print speed is not being maintained.

8. The method of claim 1, wherein determining the print engine feed rate comprises determining that the print engine feed rate is too high and decreasing the print engine feed rate.

9. A non-transitory machine-accessible medium containing instructions effective, when executing in a data processing system, to cause said data processing system to perform operations comprising:
   rasterizing pages of a print job, the print job having one or more pages to be printed;
   buffering the rasterized pages in a printer controller buffer;
   estimating a print completion rate and a number of pages in a print engine buffer of a print engine;
   determining, at the data processing system, a print engine feed rate based on the estimated print completion rate and the number of pages in the print engine buffer, wherein the print engine feed rate is the rate at which the rasterized pages are fed from the printer controller buffer to the print engine buffer; and
   transmitting the buffered rasterized pages to the print engine at a rate based on the determined print engine feed rate;
   wherein the data processing system is in communication with the variable speed printer.

10. The non-transitory machine-accessible medium of claim 9, further comprising receiving the print job from a print server.

11. The non-transitory machine-accessible medium of claim 9, further comprising:
   determining a page arrival rate for the print job; and
   determining the print engine feed rate based on the page arrival rate in addition to the estimated print completion rate and the number of pages in the print engine buffer.

12. The non-transitory machine-accessible medium of claim 9, further comprising:
   determining a page rasterization completion rate into a printer controller buffer; and
   determining the print engine feed rate based on the page rasterization completion rate in addition to the estimated print completion rate and the number of pages in the print engine buffer.

13. The non-transitory machine-accessible medium of claim 9, further comprising:
   determining page processing times for the print job; and
   determining the print engine feed rate based on the pages processing times in addition to the estimated print completion rate and the number of pages in the print engine buffer.

14. The non-transitory machine-accessible medium of claim 9, further comprising receiving an indication of a number of pages given to the print engine.

15. A print controller system for managing the print speed of a variable speed printer, the system comprising:
   a raster image processor, the raster image processor being adapted to rasterize a print job to create a plurality of rasterized pages;
   a printer controller buffer in communication with the raster image processor, the printer controller buffer being adapted to store one or more rasterized pages, wherein the printer controller buffer is further adapted to transmit at a print engine feed rate the one or more rasterized pages to a print engine; and
   a speed control module in communication with the printer controller buffer, the speed control module being adapted to determine the print engine feed rate based on a number of pages in a print engine buffer of the print engine.

16. The system of claim 15, wherein the speed control module is further adapted to determine the print engine feed rate based on one or more of page processing times, page arrival rates, estimated print completion rates, and page rasterization completion rate into the printer controller buffer.

17. The system of claim 15, wherein the speed control module is further adapted to increase the print engine feed rate in response to an increasing page arrival rate or page processing times.

18. The system of claim 15, wherein the speed control module is further adapted to decrease the print engine feed rate in response to a decreasing page arrival rate or page processing times.

19. The system of claim 15, wherein the speed control module is further adapted to increase the print engine feed rate in response to a reduction in a number of pages in a print engine buffer.

20. The system of claim 15, wherein the speed control module is further adapted to decrease the print engine feed rate in response to an increase in a number of pages in a print engine buffer.

* * * * *